United States Patent Office 3,393,776
Patented July 23, 1968

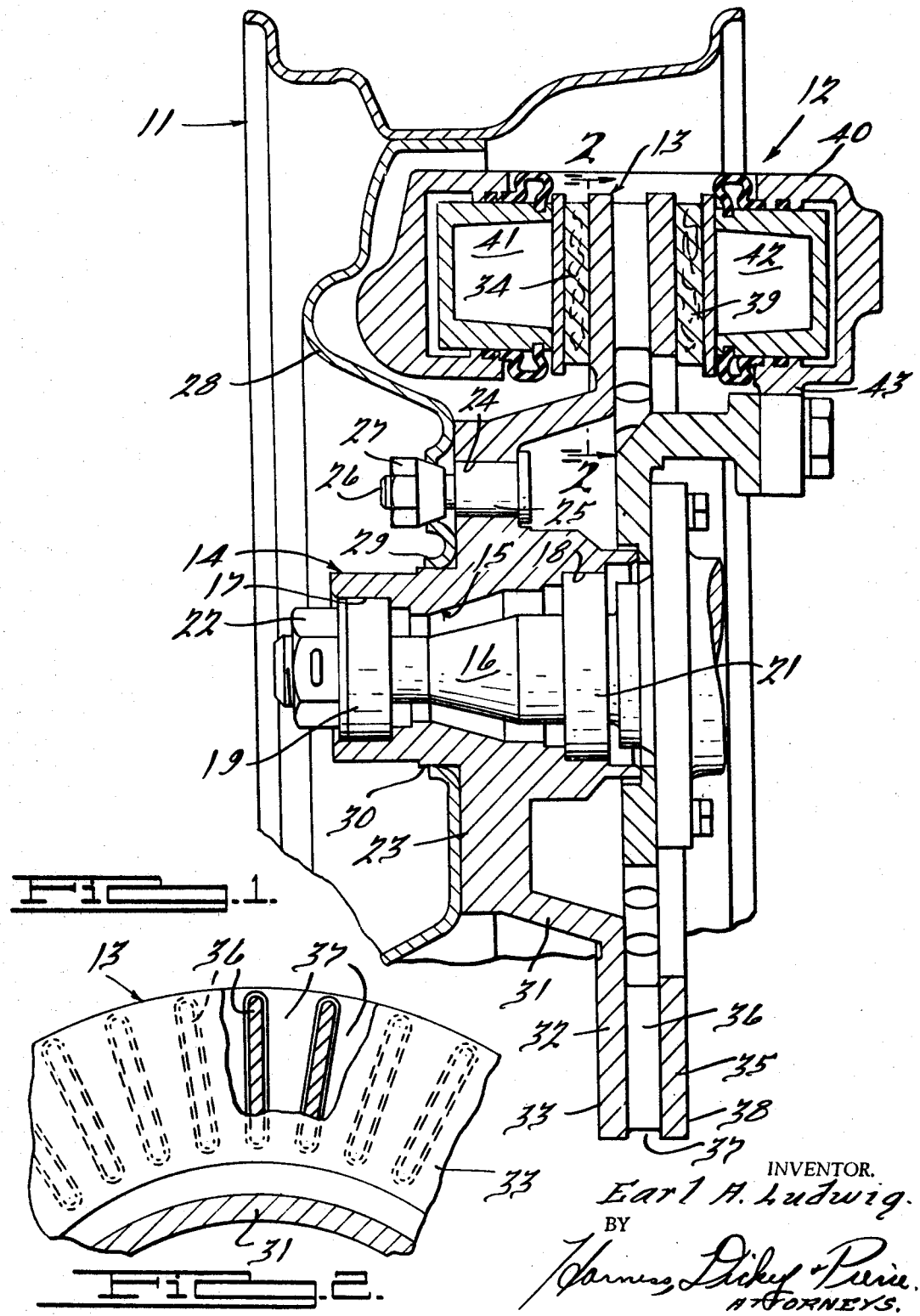

3,393,776
INTEGRAL HUB AND BRAKE DISK
Earl A. Ludwig, Dearborn Heights, Mich., assignor to Kelsey-Hayes Company, a corporation of Delaware
Filed Mar. 8, 1967, Ser. No. 621,657
1 Claim. (Cl. 188—218)

ABSTRACT OF THE DISCLOSURE

This application discloses a disk brake assembly for braking a wheel of a motor vehicle. The brake assembly is comprised of an integral wheel supporting hub and rotor disk, which disk has opposed surfaces that are engaged by the brake friction pads. The brake surfaces of the rotor are formed by spaced members that define an intermediate air gap to aid in the dissipation of the heat generated by braking. The unitary hub and brake disk assembly is formed as a casting and is made from a cast iron having at least 0.10% chromium as an alloying material to increase the strength and provide a better braking surface.

Background of the invention

This invention relates to the art of disk brakes and more particularly to a disk brake assembly embodying an improved, integral cast hub and rotor assembly.

In previously proposed disk brake assemblies, a hub has been provided to which both the vehicle wheel and brake rotor have been attached. Accurate alignment of the rotor braking surfaces and the axis of rotation of the hub is particularly important to preclude an objectional brake characteristic known as "roughness" and other braking problems. The previous use of separate pieces has required accurate machining and an objectionable assembly step. In addition, it is particularly important that the heat generated by the braking action be rapidly dissipated. The separate connection between the brake disk and hub gives rise to what may be considered a thermal barrier thus rendering more acute the heat dissipation problems.

Although the formation of the disk and hub as a single piece casting will overcome certain of the aforenoted problems, conventional gray cast iron is not ideally suited for this application. Gray cast irons are brittle, as is well known, and thus may not be sufficiently strong for such an application. Malleble iron, although it has the requisite strength, is considerably more expensive than gray cast iron. In addition, these materials do not offer ideal surface properties for use in a brake.

It is, therefore, a principal object of this invention to provide an improved integral brake rotor and hub assembly and material therefor.

It is a further object of this invention to provide an improved integral brake rotor and hub assembly formed from a material that has good braking properties with no sacrifice in strength.

It is another object of this invention to provide an integral brake rotor and hub assembly that facilitates assembly and hence reduces cost.

Summary of the invention

A unitary rotor and hub assembly embodying this invention is particularly adapted for use in a disk brake assembly for braking a vehicular wheel or the like. The rotor and hub assembly comprises a hub portion defining an aperture for receipt of a wheel supporting spindle. The hub portion defines bearing supporting means juxtaposed to the aperture for receiving an antifriction bearing to rotatably support the assembly upon the spindle. A brake rotor is integrally connected to the hub and extends outwardly therefrom. The brake rotor has an annular surface extending generally radially with respect to the axis of rotation of the assembly, which surface is adapted to be engaged by a disk brake pad. The assembly is formed from a cast iron having a chromium content greater than 0.10%.

Brief description of the drawing

FIGURE 1 is a cross-sectional view taken through the axis of rotation of a vehicular wheel assembly and associated disk brake embodying this invention.

FIGURE 2 is a cross-sectional view taken generally in the direction of the line 2—2 in FIGURE 1 with a portion broken away.

Description of the preferred embodiment

Referring now in detail to the drawings, the invention is depicted for use in a disk brake assembly for braking a motor vehicle wheel, indicated generally by the reference numeral 11. The disk brake assembly is comprised of a caliper assemblage 12 and a combined integral rotor or disk and hub assembly 13.

The rotor and hub assembly 13 has a hub portion 14 through which a stepped bore 15 extends. The bore 15 is adapted to receive a wheel supporting spindle 16, of any known type, which is carried in any suitable manner by a vehicle chassis. The stepped bore 15 is provided with two axially spaced cylindrical portions 17 and 18 formed adjacent its opposite ends. Antifriction bearings 19 and 21 are received in the cylindrical portions 17 and 18, respectively, to rotatably support the assembly 13 upon the spindle 16. A suitable nut 22 and associated fastening means are provided to axially fix the assembly 13 onto the spindle 16 in a known manner.

The outer periphery of the hub 14 in the area axially between the bore portions 17 and 18 is integrally connected to a radially outwardly extending, generally disk shaped portion 23 in which a plurality of circumferentially spaced bores 24 (only one of which is shown) are formed. Headed studs 25 are press fitted into each of the bores 24 and have outwardly extending threaded ends 26 that are adapted to threadingly receive nuts 27. The nuts 27 coact with a spider 28 of the wheel 11 to affix the wheel assembly 11 onto the hub 14 in a known manner. The wheel spider 28 is also provided with an outturned pilot portion 29 that is received upon a cylindrical outer surface 30 of the hub 14 adjacent the portion 23 to facilitate alignment and assembly.

The outer terminus of the disk shaped portion 23 terminates in an intergral inwardly extending flange 31 having a generally conical shape. The flange 31 terminates in a generally radially extending, integral annular disk 32 having an outer surface or face 33 that is adapted to be engaged by a friction pad 34 of the brake caliper assembly 12. A second annular disk 35 is integrally connected to the disk 33 by means of a plurality of radially extending ribs 36 to define air gaps 37 between the inner or adjacent faces of the disks 33 and 35. These air gaps facilitate the dissipation of the heat generated by the braking action to the atmosphere. The disk 35 has a radially extending surface 38 that is adapted to be engaged by another friction pad 39 of the caliper assembly 12.

The caliper assembly 12 includes a housing 40 in which hydraulically actuated pistons 41 and 42 are contained, which pistons actuate the friction pads 34 and 39 in a known manner. The housing 40 is fixed stationarily with respect to the vehicle by means of a mounting flange 43 in any known manner. Since the caliper assembly 12 forms no part of this invention, it will not be described in more detail.

As has been noted, the rotor and hub assembly 13 is integral. That is, the hub 14, flanges 23 and 31 and disks 33 and 35 are all integrally connected to each other. A rough casting of such a piece preferably is made from cast iron. Conventional gray cast iron is not used, however, due to its brittleness. In addition, the cast iron is alloyed with chromium in an amount at least in excess of 0.10% to increase the strength of the casting and to provide better surface properties on the disk brake surfaces 33 and 38. A preferred composition for the cast iron used in conjunction with this invention is:

|  | Percent |
|---|---|
| Total carbon | 3.25–3.50 |
| Combined carbon, desired | 0.60–0.80 |
| Manganese | 0.60–0.90 |
| Silicon | 1.80–2.05 |
| Phosphorous, max. | 0.20 |
| Sulphur, max. | 0.12 |
| Chromium | 0.25–0.55 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

1. A unitary rotor and hub assembly for a disk brake, said assembly comprising a hub portion defining an aperture for receipt of a wheel supporting spindle, said hub portion defining bearing supporting means juxtaposed to said aperture for receiving an anti-friction bearing to rotatably support said assembly upon the spindle, and a brake rotor integrally connected to said hub portion and extending outwardly therefrom, said brake rotor having a pair of oppositely facing annular surfaces formed by spaced annular portions and adapted to be engaged by disk brake pads, one of said annular rotor portions being integrally connected to said hub portion, the other of said annular rotor portions being integrally connected to said one annular rotor portions by a plurality of circumferentially spaced spacer portions for defining air gaps between said annular rotor portions to facilitate the dissipation of heat from said annular rotor portions, said assembly being formed as a casting from cast iron having a composition compirsing chromium in the range of about 0.25% to 0.55%, total carbon in the range of about 3.25 to 3.50%, combined carbon in the range of about 0.60 to 0.80%, manganese in the range of about 0.60 to 0.90%, silicon in the range of about 1.80 to 2.05%, a maximum phosphorous content of about 0.20% and a maximum sulphur content of about 0.12%.

References Cited

UNITED STATES PATENTS

| 2,629,464 | 2/1953 | Helsten. |
| 2,850,118 | 9/1958 | Byers. |
| 3,318,423 | 5/1967 | Dunki. |

FOREIGN PATENTS

| 516,281 | 9/1955 | Canada. |

MILTON BUCHLER, *Primary Examiner.*

GEORGE E. A. HALVOSA, *Assistant Examiner.*